United States Patent
Doering

(10) Patent No.: US 10,549,744 B2
(45) Date of Patent: Feb. 4, 2020

(54) METHODS AND SYSTEM FOR DOWNSHIFTING A TRANSMISSION

(71) Applicant: Ford Global Technologies, LLC, Dearborn, MI (US)

(72) Inventor: Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 449 days.

(21) Appl. No.: 15/349,688

(22) Filed: Nov. 11, 2016

(65) Prior Publication Data
US 2018/0134272 A1    May 17, 2018

(51) Int. Cl.
| | |
|---|---|
| *B60W 10/06* | (2006.01) |
| *B60W 20/10* | (2016.01) |
| *B60W 10/08* | (2006.01) |
| *B60W 30/18* | (2012.01) |
| *B60K 6/547* | (2007.10) |
| *F02D 41/00* | (2006.01) |
| *F02D 41/02* | (2006.01) |
| *F02D 41/12* | (2006.01) |

(52) U.S. Cl.
CPC ............ *B60W 20/10* (2013.01); *B60K 6/547* (2013.01); *B60W 10/06* (2013.01); *B60W 10/08* (2013.01); *B60W 30/18072* (2013.01); *F02D 41/0087* (2013.01); *F02D 41/0225* (2013.01); *F02D 41/123* (2013.01); *B60W 2510/1005* (2013.01); *B60W 2710/0616* (2013.01); *B60W 2710/0627* (2013.01); *B60W 2710/0666* (2013.01); *B60W 2710/0683* (2013.01); *B60W 2710/083* (2013.01); *B60Y 2200/92* (2013.01); *B60Y 2300/182* (2013.01); *B60Y 2300/18066* (2013.01); *B60Y 2300/432* (2013.01); *B60Y 2300/437* (2013.01); *B60Y 2300/60* (2013.01); *Y10S 903/919* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 7,503,873 B2 | 3/2009 | Nakajima et al. | |
| 2002/0112903 A1 | 8/2002 | Wakashiro et al. | |
| 2004/0102288 A1* | 5/2004 | Ayabe | B60W 10/06 477/117 |
| 2004/0163866 A1 | 8/2004 | Sen et al. | |
| 2004/0182340 A1* | 9/2004 | Cecur | F01L 1/185 123/90.16 |
| 2005/0279323 A1* | 12/2005 | Lewis | F01L 13/0005 123/321 |

(Continued)

OTHER PUBLICATIONS

Doering, Jeffrey Allen, et al., "Methods and System for Improving Response of a Hybrid Vehicle," U.S. Appl. No. 15/356,449, filed Nov. 18, 2016, 43 pages.

*Primary Examiner* — Justin Holmes
(74) *Attorney, Agent, or Firm* — Geoffrey Brumbaugh; McCoy Russell LLP

(57) ABSTRACT

Systems and methods for operating a driveline of a hybrid vehicle are disclosed. In one example, an engine may enter or stay in one of two cylinder deactivation modes or enter or stay in a combustion mode in response to a request to downshift a transmission while a vehicle in which the engine resides is coasting.

20 Claims, 8 Drawing Sheets

(56) References Cited

U.S. PATENT DOCUMENTS

2010/0131160 A1\* 5/2010 Ayabe .................. F02D 31/007
                                                              701/54
2016/0245190 A1\* 8/2016 Makled ................ B60W 10/06

\* cited by examiner

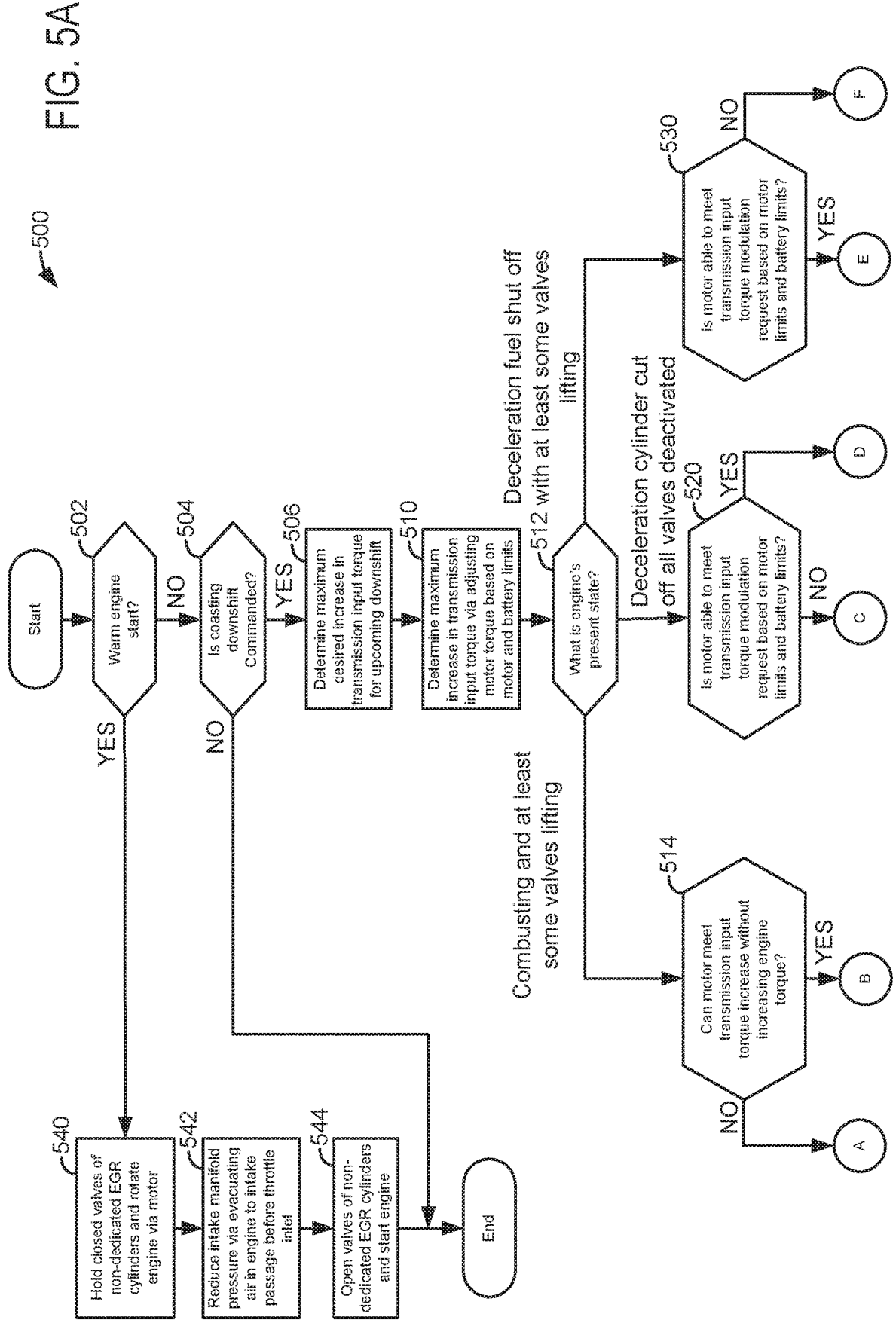

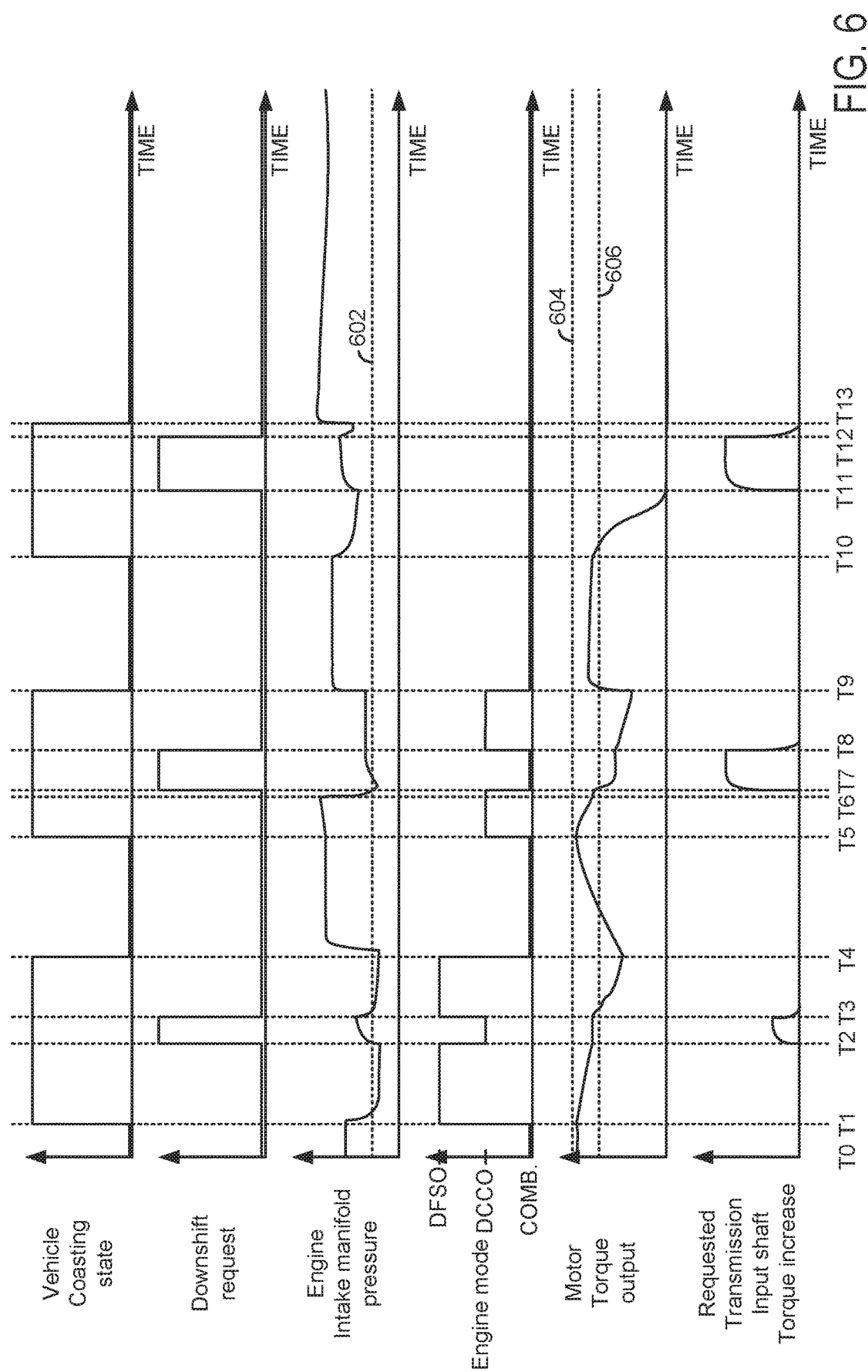

METHODS AND SYSTEM FOR DOWNSHIFTING A TRANSMISSION

FIELD

The present description relates to methods and a system for operating a hybrid powertrain that includes an engine and an electric machine to propel a vehicle. The methods and systems may be particularly useful for hybrid vehicles that downshift while driver demand torque is less than a threshold level.

BACKGROUND AND SUMMARY

A vehicle may coast from time to time and the vehicle may decelerate while coasting due to friction losses and windage losses. A controller of the vehicle may schedule a downshift of a step ratio automatic transmission in response to the vehicle decelerating below a threshold shift schedule vehicle speed. By downshifting the transmission, the vehicle may be prepared to accelerate at a later time. Further, downshifting the transmission may help to keep engine speed within a desired range. However, if the vehicle is decelerating and transmission input shaft torque is lower than desired, a torque disturbance may propagate through the driveline when the transmission downshifts. Therefore, it would be desirable to provide a way of controlling transmission input shaft torque so that driveline torque disturbances may be reduced.

The inventor herein has recognized the above-mentioned issues and has developed a driveline operating method, comprising: adjusting torque of a motor, adjusting a state of an engine cylinder poppet valve actuator, and adjusting a fuel injector operating state via one or more controllers in response to an increase in requested transmission input shaft torque and a transmission downshift request during vehicle coasting.

By adjusting torque of a motor, state of an engine cylinder poppet valve, and state of a fuel injector, it may be possible to reduce the possibility of driveline torque disturbances while a vehicle is coasting and a downshift is requested. For example, driveline torque disturbances may be reduced via increasing a transmission input shaft torque in response to a downshift request while a vehicle is decelerating. The transmission input shaft torque may be increased via entering a deceleration cylinder cut off mode from a deceleration fuel shut off mode. Thus, transmission input shaft torque may be increased without activating cylinders or increasing torque output from a motor of the driveline. In other examples, selected engine cylinders may be activated to increase the transmission input shaft torque in response to the transmission downshift request.

The present description may provide several advantages. In particular, the approach may reduce vehicle driveline torque disturbances. Further, the approach may manage driveline torque in a way that reduces vehicle fuel consumption. Further still, the approach may improve downshifting via coordinated control of a motor and an engine in ways that may be less noticeable to vehicle occupants.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIGS. 5A and 5B show an example method for operating a hybrid driveline; and

FIG. 6 shows an example hybrid vehicle operating sequence.

DETAILED DESCRIPTION

Figure 1:
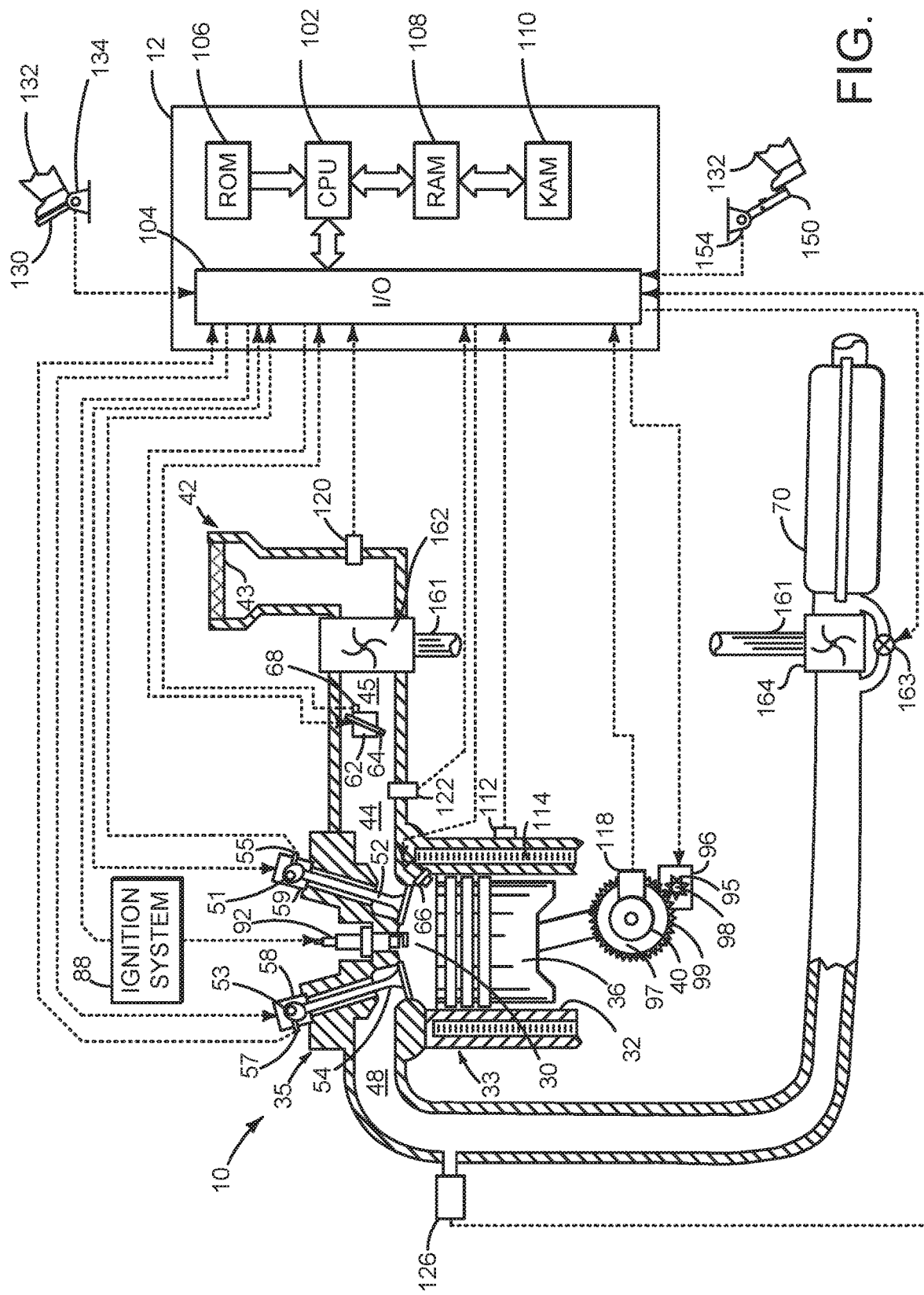
FIG. 1 is a schematic diagram of an engine.
Figure 2A:
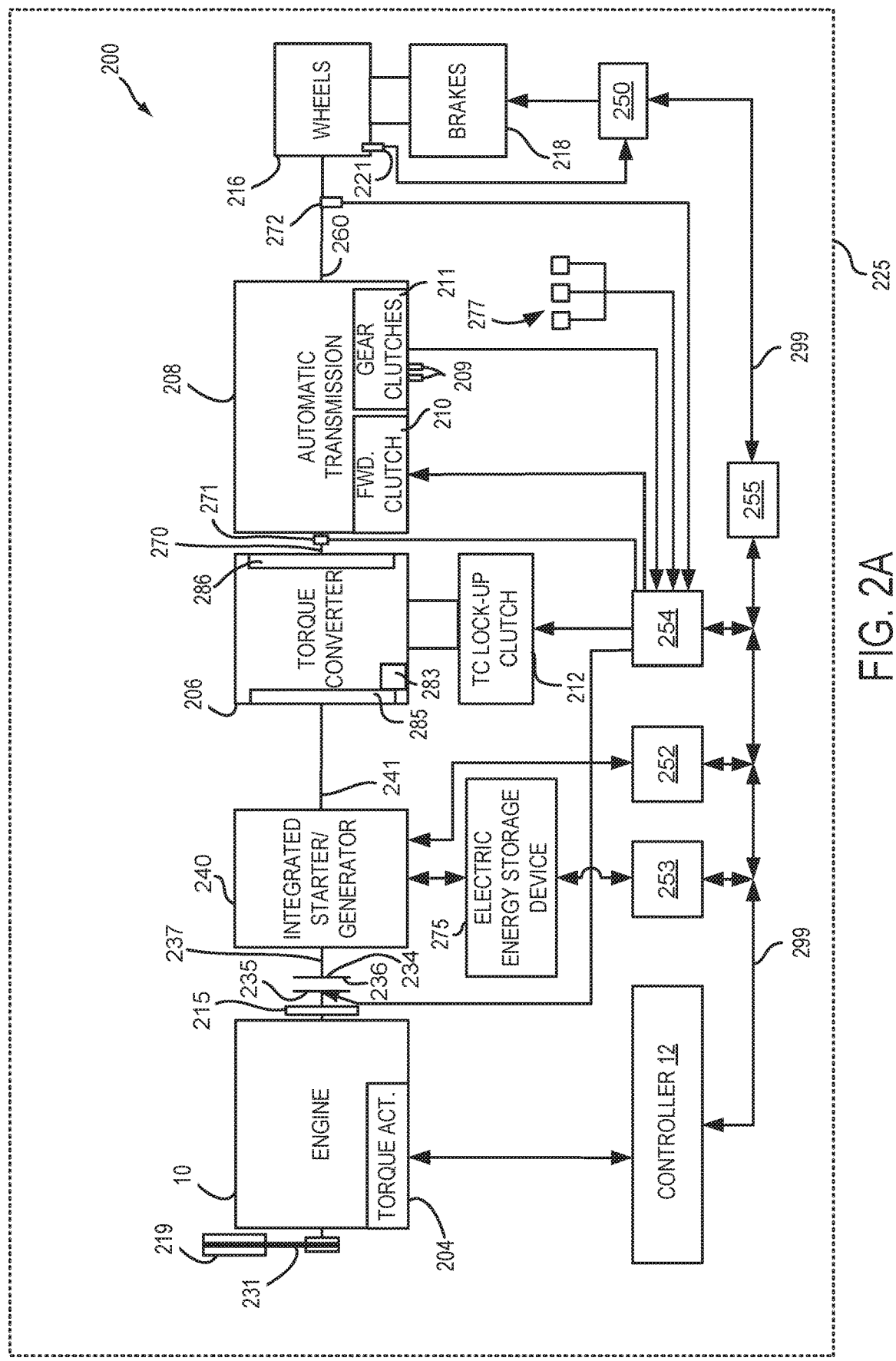
FIGS. 2A and 2B are schematic diagrams of two example hybrid vehicle driveline.
Figure 2B:
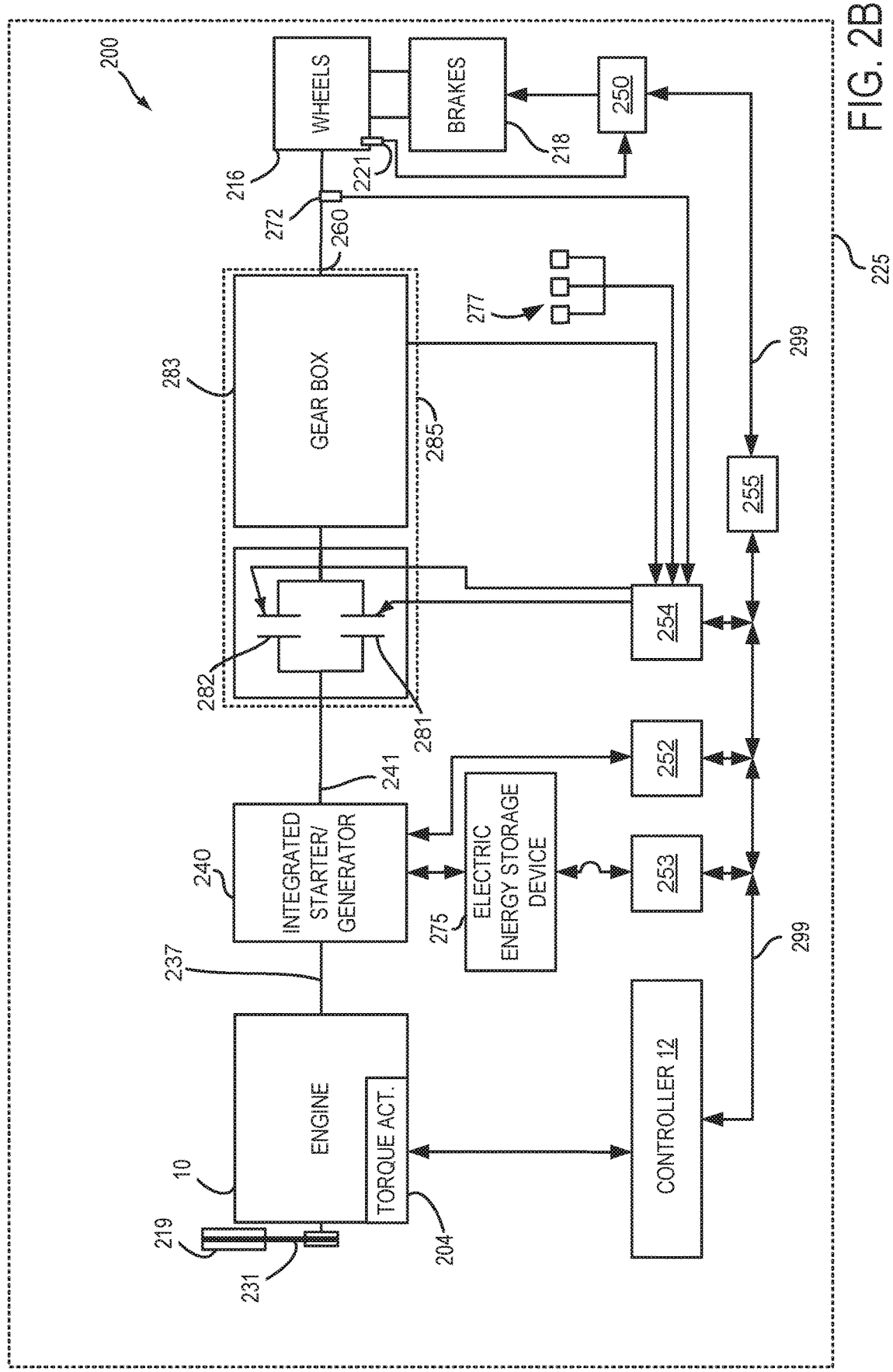
Figure 3A:
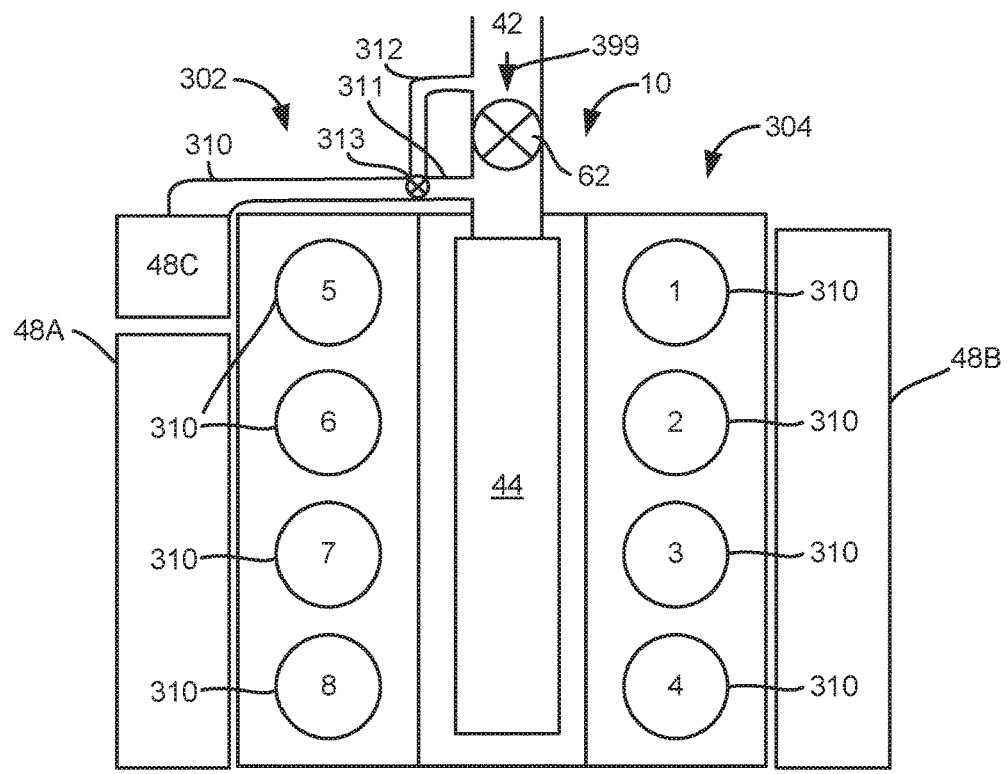
FIGS. 3A and 3B show example engines with dedicated EGR.
Figure 3B:
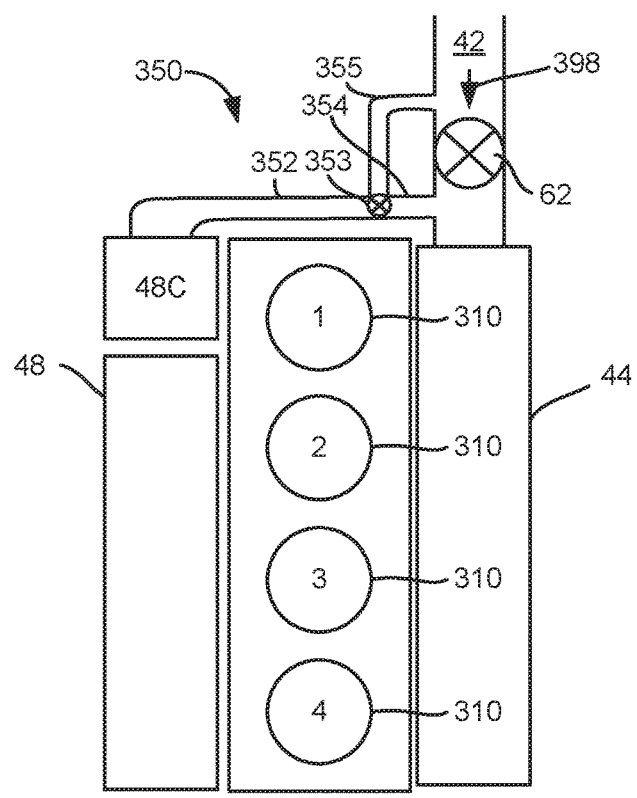
Figure 4A:
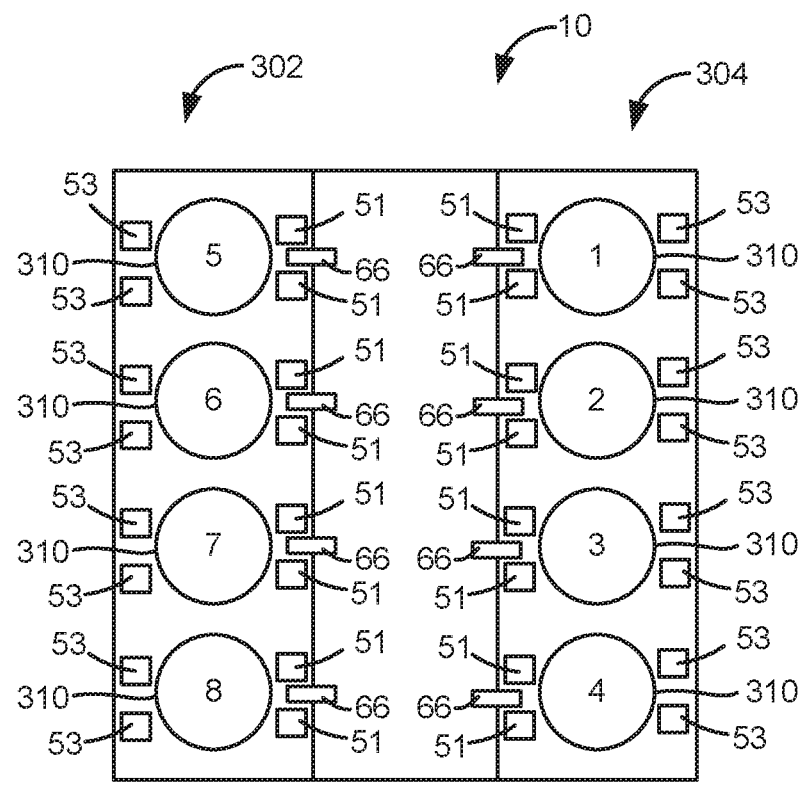
FIGS. 4A and 4B show example engines with deactivating valves.
Figure 4B:
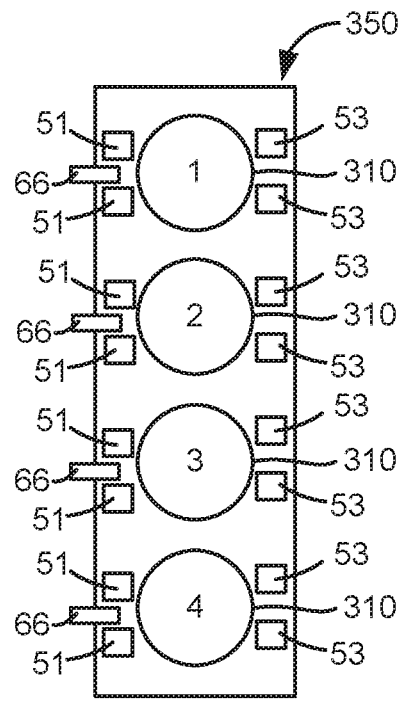

The present description is related to controlling transmission input shaft torque of a hybrid vehicle. The hybrid vehicle may include an internal combustion engine as shown in FIG. 1. The internal combustion engine may be included in a driveline or powertrain of a hybrid vehicle as shown in FIGS. 2A and 2B. The engine may include a dedicated exhaust gas recirculation (EGR) cylinder as shown in FIGS. 3A and 3B. The engine may also include deactivating cylinders and deactivating poppet valves as shown in FIGS. 4A and 4B. The hybrid driveline or powertrain may be operated according to the method of FIGS. 5A and 5B. FIG. 6 shows a vehicle operating sequence according to the method of FIGS. 5A and 5B.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake camshaft 51 and an exhaust camshaft 53. The position of intake camshaft 51 may be determined by intake camshaft sensor 55. The position of exhaust camshaft 53 may be determined by exhaust camshaft sensor 57. Intake valves may be held open or closed over an entire engine cycle as the engine rotates via deactivating intake valve actuator 59, which may electrically, hydraulically, or mechanically operate intake valves. Alternatively, intake valves may be opened and closed during a cycle of the engine. Exhaust valves may be held open or closed over an entire engine cycle (e.g., two engine revolutions) as the engine rotates via deactivating exhaust valve actuator 58, which may be electrically, hydraulically, or mechanically operate exhaust valves. Alternatively, exhaust valves may be opened and closed during a cycle of the engine.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2A is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via belt driven integrated starter/generator (BISG) 219, or via driveline integrated starter/generator (ISG) 240 also known as a motor/generator. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

BISG is mechanically coupled to engine 10 via belt 231. BISG may be coupled to crankshaft 40 or a camshaft (e.g., 51 or 53). BISG may operate as a motor when supplied with electrical power via electric energy storage device 275. BISG may operate as a generator supplying electrical power to electric energy storage device 275.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 is in electrical communication with energy storage device 275. ISG 240 has a higher output torque capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 235. ISG 240 may provide a positive torque or a negative torque to powertrain 200 via operating as a motor or generator as instructed by electric machine controller 252.

Torque converter 206 includes a turbine 286 to output torque to input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed step ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG 240 or BISG 219. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206, which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and/or engine 10, and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Engine 10 may also provide a negative torque by ceasing fuel delivery to engine cylinders. Engine cylinders may be deactivated with intake and exhaust valves opening and closing during engine rotation or with intake and exhaust valves held closed over one or more engine cycles while the engine rotates. Any portion of desired negative wheel torque that may not be provided by engine 10 and/or ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

In other examples, engine 10 may be coupled to an electric dynamometer that rotates engine 10 while it is not receiving fuel. In still other examples, engine 10 may be in communication with a motor of a parallel or series hybrid driveline. Thus, camshaft timing for a non-reference engine may be revised in different settings.

Referring now to FIG. 2B, an alternative driveline or powertrain 200 is shown. The driveline of FIG. 2B includes many of the same components as shown in FIG. 2A. Components in FIG. 2B having the same numerical values as components shown in FIG. 2A are the same components. Further, same components operate in a same way. Therefore, for the sake of brevity, descriptions of similar components may be omitted.

Driveline 200 includes engine 10 mechanically coupled to ISG 240 via shaft 237. ISG 240 is mechanically coupled to dual clutch transmission (DCT) 285 via shaft 241. DCT 285 includes a first clutch 281, second clutch 282, and gearbox 283. DCT 285 outputs torque to shaft 260 to supply torque to vehicle wheels 216. Transmission controller selectively opens and closes first clutch 281 and second clutch 282 to shift DCT 285.

Referring now to FIG. 3A, an example multi-cylinder engine 10 that includes two cylinder banks is shown. The engine includes cylinders and associated components as shown in FIG. 1. Engine 10 includes eight cylinders 310. Each of the eight cylinders 310 is numbered and the numbers of the cylinders are included within the cylinders. Air enters engine 10 from air intake 42 and travels in the direction shown by arrow 399. Air passes through throttle 62 and into engine intake manifold 44 when throttle 62 is open. Air enters cylinders 1-8 via engine intake manifold 44. Combustion byproducts (e.g., exhaust gas) pass from cylinders 1-4 and 6-8 into respective exhaust manifolds 48A and 48B. Exhaust gases from cylinder number 5 do not flow into exhaust manifold 48A or 48B. Rather, exhaust gases from cylinder number 5 enter passage 48C and may be directed to intake manifold 44 or upstream of throttle 62 to engine air intake 42. Thus, cylinder number 5 is a dedicated EGR cylinder that may circulate all of its exhaust gas to intake manifold 44 or engine air intake 42. Further, cylinder number 5 may evacuate air from intake manifold 44 to engine air intake upstream of throttle 62 and a turbocharger compressor inlet when engine 10 is rotated via its inertia or a motor while throttle 62 is closed. Valves of cylinders 1-4 and 5-8 may be held closed as the motor rotates the engine and cylinder number 5 pumps air from intake manifold to engine air intake. By pumping air from intake manifold 44 to upstream of throttle 42 via dedicated EGR cylinder number 5, air may be pumped from intake manifold 44 without pumping fresh air to catalyst 70 shown in FIG. 1. Air may be pumped from intake manifold 44 to passage 48C and onto passage 310 where three-way valve 313 directs the air to passage 312. After engine 10 is started, exhaust gas from cylinder number 5 may be directed to intake manifold via passage 48C, passage 310, and passage 311.

Engine 10 may also include deactivating valve actuators as shown in FIG. 4A. The deactivating valve actuators make it possible to pump air from intake manifold 44 to engine air intake 42 without directing air to catalyst 70. Consequently, a catalyst may be balanced closer to a desired ratio of hydrocarbons and CO to oxygen than if engine 10 were to pump air to the catalyst during engine restarting while the engine is warm.

Referring now to FIG. 3B, an example multi-cylinder engine that includes one cylinder banks is shown. The engine includes cylinders and associated components as shown in FIG. 1. Engine 10 includes four cylinders 310. Each of the four cylinders is numbered and the numbers of the cylinders are included within the cylinders. Cylinders 1-4 receive air from engine air intake 42 via throttle 62 and engine intake manifold 44 as indicated by the direction of arrow 398. Combustion byproducts pass from cylinders 2-4 into exhaust manifold 48. Exhaust gases from cylinder number 1 do not flow into exhaust manifold 48. Rather, exhaust gases from cylinder number 1 enter passage 48C and may be directed to intake manifold 44 or upstream of throttle 62 to engine air intake 42. Thus, cylinder number 1 is a dedicated EGR cylinder that may circulate all of its exhaust gas to intake manifold 44 or engine air intake 42. Further, cylinder number 1 may evacuate air from intake manifold 44 to engine air intake upstream of throttle 62 and a turbocharger compressor inlet when engine 10 is rotated via a motor and throttle 62 is closed. Valves of cylinders 2-4 may be held closed as the motor rotates the engine and cylinder number 1 pumps air from intake manifold to engine air intake. By pumping air from intake manifold 44 to upstream of throttle 42 via dedicated EGR cylinder number 1, air may be pumped from intake manifold 44 without pumping fresh air to catalyst 70 shown in FIG. 1. Air may be pumped from intake manifold 44 to passage 48C and onto passage 352 where three-way valve 353 directs the air to passage 355. After engine 10 is started, exhaust gas from cylinder number 1 may be directed to intake manifold via passage 48C, passage 352, and passage 354.

Engine 10 may also include deactivating valve actuators as shown in FIG. 4B. The deactivating valve actuators make it possible to pump air from intake manifold 44 to engine air intake 42 without directing air to catalyst 70. Consequently, a catalyst may be balanced closer to a desired ratio of hydrocarbons and CO to oxygen than if engine 10 were to pump air to the catalyst during engine restarting while the engine is warm. It should be appreciated that engine 10 may have more than one dedicated EGR cylinder which may be used to pump air from the engine intake manifold to the engine air intake.

Referring now to FIG. 4A, an example multi-cylinder engine 10 showing deactivating intake and exhaust valve actuators is shown. The engine includes cylinders and associated components as shown in FIGS. 1 and 3A. Engine 10 includes eight cylinders 310. Each of the eight cylinders is numbered and the numbers of the cylinders are included within the cylinders. Fuel injectors 66 selectively supply fuel to each of the cylinders that are activated (e.g., combusting fuel during a cycle of the engine). Cylinders 1-8 may be selectively deactivated to improve engine fuel economy when less than the engine's full torque capacity is requested. Further, intake and exhaust valves of selected cylinders may be deactivated to change engine pumping characteristics. For example, cylinders 2, 3, 5, and 8 (e.g., a fixed pattern of deactivated cylinders) may be deactivated during an engine cycle (e.g., two revolutions for a four stroke engine) and may be deactivated for a plurality of engine cycles while engine speed and load are constant or very slightly. During a different engine cycle, a second fixed pattern of cylinders 1, 4, 6, and 7 may be deactivated. Further, other patterns of cylinders may be selectively deactivated based on vehicle operating conditions. Additionally, engine cylinders may be deactivated such that a fixed pattern of cylinders is not deactivated over a plurality of engine cycles. Rather, cylinders that are deactivated may change from one engine cycle to the next engine cycle. Each cylinder includes variable intake valve operators 51 and variable exhaust valve operators 53. An engine cylinder may be deactivated by its variable intake valve operators 51 and variable exhaust valve operators holding intake and exhaust valves of the cylinder closed during an entire cycle of the cylinder. An engine cylinder may be activated by its variable intake valve operators 51 and variable exhaust valve operators 53 opening and closing intake and exhaust valves of the cylinder during a cycle of the cylinder. Engine 10 includes a first cylinder bank 304, which includes four cylinders 1, 2, 3, and 4. Engine 10 also includes a second cylinder bank 302, which includes four cylinders 5, 6, 7, and 8. Cylinders of each bank may be active or deactivated during a cycle of the engine.

Referring now to FIG. 4B, an example multi-cylinder engine 10 showing deactivating intake and exhaust valves actuators is shown. The engine includes cylinders and associated components as shown in FIGS. 1 and 3B. Engine 10 includes four cylinders 310. Each of the four cylinders is numbered and the numbers of the cylinders are included within the cylinders. Fuel injectors 66 selectively supply fuel to each of the cylinders that are activated (e.g., combusting fuel during a cycle of the engine with intake and exhaust valves opening and closing during a cycle of the cylinder that is active). Cylinders 1-4 may be selectively deactivated (e.g., not combusting fuel during a cycle of the engine with intake and exhaust valves held closed over an entire cycle of the cylinder being deactivated) to improve engine fuel economy when less than the engine's full torque capacity is requested. For example, cylinders 2 and 3 (e.g., a fixed pattern of deactivated cylinders) may be deactivated during a plurality of engine cycles (e.g., two revolutions for a four stroke engine). During a different engine cycle, a second fixed pattern cylinders 1 and 4 may be deactivated over a plurality of engine cycles. Further, other patterns of cylinders may be selectively deactivated based on vehicle operating conditions. Additionally, engine cylinders may be deactivated such that a fixed pattern of cylinders is not deactivated over a plurality of engine cycles. Rather, cylinders that are deactivated may change from one engine cycle to the next engine cycle. In this way, the deactivated engine cylinders may rotate or change from one engine cycle to the next engine cycle.

Engine 10 includes a single cylinder bank 350, which includes four cylinders 1-4. Cylinders of the single bank may be active or deactivated during a cycle of the engine. Each cylinder includes variable intake valve operators 51 and variable exhaust valve operators 53. An engine cylinder may be deactivated by its variable intake valve operators 51 and variable exhaust valve operators holding intake and exhaust valves of the cylinder closed during a cycle of the cylinder. An engine cylinder may be activated by its variable intake valve operators 51 and variable exhaust valve operators 53 opening and closing intake and exhaust valves of the cylinder during a cycle of the cylinder.

Thus, the system of FIGS. 1-4B provides for a system, comprising: an engine; an integrated starter/generator coupled to the engine; a transmission couple to the integrated starter/generator; and a vehicle system controller including executable instructions stored in non-transitory memory to maintain or increase torque output of the integrated starter/generator and enter the engine into one of two cylinder deactivation modes in response to a request to downshift a transmission while a vehicle in which the engine resides is coasting. The system further comprises deactivating cylinder valve actuators, and further comprises additional instructions to adjust an operating state of the deactivating cylinder valve actuators in response to the request to downshift the transmission. The system further comprises additional instructions to determine an increase in transmission input shaft torque for the requested downshift. The system further comprises additional instructions to reduce an intake manifold pressure of the engine without directing air from an intake manifold of the engine to a catalyst coupled to the engine. The system further comprises additional instructions to reduce intake manifold pressure of the engine and directing air from the intake manifold of the engine to a catalyst coupled to the engine. The system includes where the engine includes a dedicated exhaust gas recirculation cylinder.

Figure 5B:
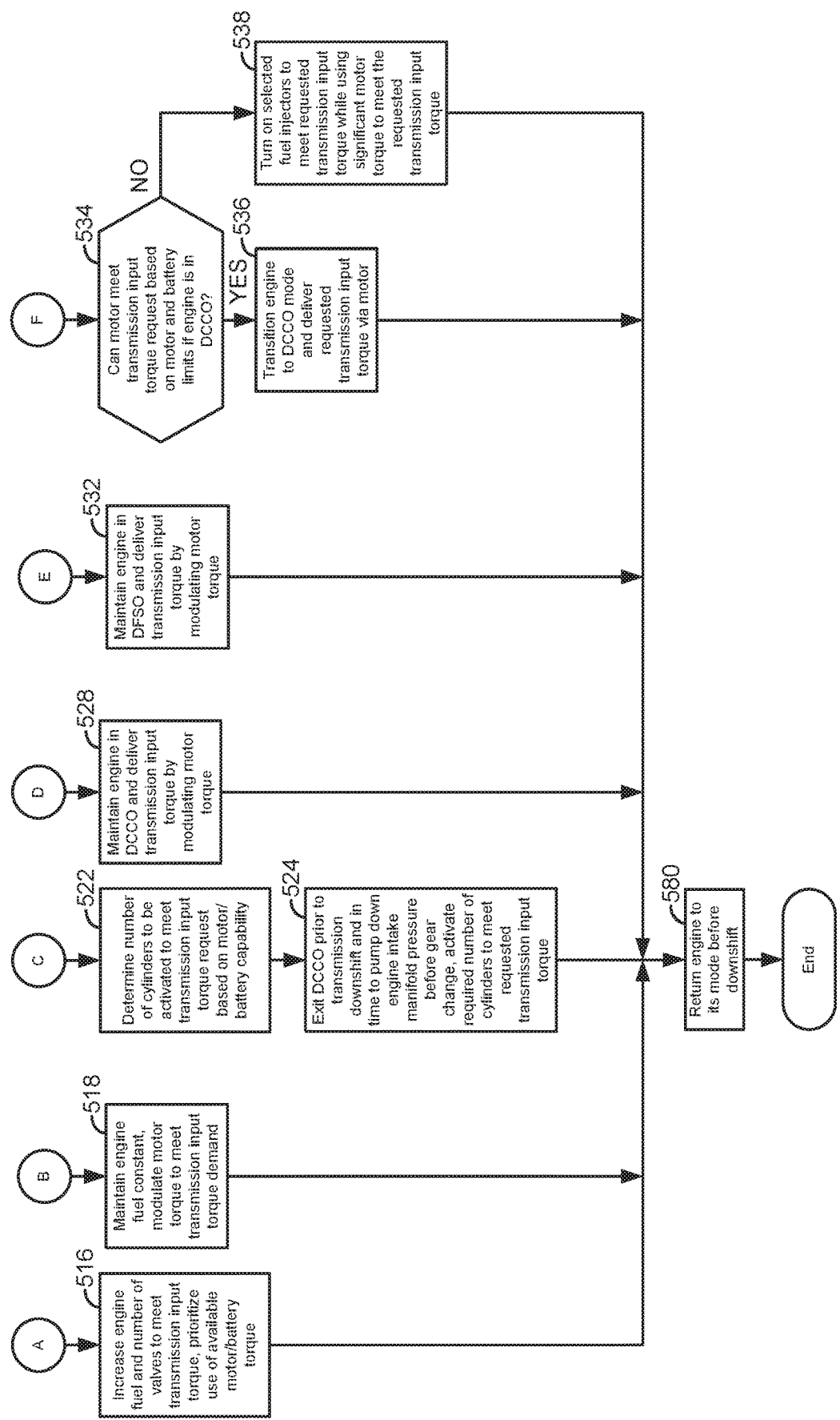

Referring now to FIGS. 5A and 5B, a method for operating a hybrid vehicle is disclosed. The method of FIGS. 5A and 5B may be incorporated into the system of FIGS. 1-4B as executable instructions stored in non-transitory memory. Additionally, portions of the method of FIGS. 5A and 5B may be acts performed via the controller 12 shown in FIGS. 1, 2A, and 2B to transform a state of a device or actuator in the real world.

At 502, method 500 judges if a warm engine start is requested. A warm engine start may be requested via a human driver applying a switch or pushbutton to request engine starting. Alternatively, a warm engine start may be requested via controller that requests an engine restart in response to vehicle operating conditions. Method 500 may judge that a warm engine restart is requested when engine temperature is greater than a threshold and/or catalyst temperature is greater than a threshold. If method 500 judges that warm engine restart is requested, the answer is yes and method 500 proceeds to 540. Otherwise, the answer is no and method 500 proceeds to 504.

At 540, method 500 deactivates valves on non-dedicated EGR cylinders so that the deactivated valves are held closed over an engine cycle. By holding the valves closed, air from the engine intake manifold is not pumped to the catalyst in the engine's exhaust system. In this way, the amount of oxygen stored in the catalyst may not increase significantly so that NOx conversion efficiency may remain high after a warm engine restart. The intake and exhaust valves of a dedicated EGR cylinder are allowed to open and close as the engine rotates so that air may be evacuated from the engine's intake manifold. In addition, a valve may be adjusted to direct air from the dedicated EGR cylinder to a location upstream of an engine throttle and compressor inlet. Method 500 proceeds to 542.

At 542, method 500 pumps air from the engine's intake manifold to the engine air intake while the throttle is closed so that engine intake manifold pressure is reduced. Method 500 reduces engine intake manifold pressure to less than a threshold pressure and then proceeds to 544. The threshold pressure may be an empirically determined pressure that provides a desired amount of engine torque when the engine is supplied with a stoichiometric air-fuel ratio.

At 544, method 500 begins opening and closing intake and exhaust valves of non-dedicated EGR cylinders. Further, method 500 supplies fuel and spark to all engine cylinders. However, in some examples where a low engine torque is requested, only a portion of non-dedicated EGR cylinder valves may be reactivated (e.g., opened and closed over an engine cycle) to reactivate a portion of the non-dedicated EGR cylinders. Combustion is initiated in the non-dedicated EGR cylinders and the engine is started. Additionally, spark and fuel may be supplied to the dedicated EGR cylinder so that it also begins combusting air and fuel. Method 500 proceeds to exit.

In another representation, for any engine start, whether the engine is cold or warm, air flow from the engine intake manifold to the non-dedicated EGR manifold (e.g., 48, 48A, and 48B) is inhibited or stopped while the engine is rotated via a motor in response to a request to start the engine. The air flow from the intake manifold to the non-dedicated EGR manifold is ceased via holding intake and/or exhaust valves in a closed state over an entire engine cycle until engine manifold pressure is reduced to less than a threshold pressure. The engine intake manifold pressure is reduced by flowing air from the intake manifold to the dedicated EGR manifold (e.g., 48C) and then directing air from the dedicated EGR manifold to the engine air intake at a location upstream of a central throttle (e.g., 62). Once engine intake manifold pressure is less than the threshold pressure, the intake and/or exhaust valves of non-dedicated EGR cylinders are activated to open and close during an engine cycle. Spark and fuel are provided to non-dedicated EGR cylinders in response to intake manifold pressure being less than the threshold pressure. Intake and exhaust valves of dedicated EGR cylinders may open and close during engine cycles (e.g., two engine rotations) during the entire time the engine is rotating. In this way, pumping of air through the cylinders may be avoided to improve catalyst efficiency. Further, lower intake manifold pressure at engine starting may improve engine torque control and engine speed control during engine restarting. Thus, an engine operating method, comprising: deactivating (e.g., holding closed over an entire engine cycle) one or more intake and/or exhaust valves of non-dedicated EGR cylinders in response to a request to start an engine; closing an engine throttle valve, rotating an engine and pumping air from an engine intake manifold to an engine air intake at a location upstream of the engine throttle; activating the one or more intake and/or exhaust valves of non-dedicated EGR cylinders in response to intake manifold pressure less than a threshold while the engine is rotating, and initiating combustion in engine cylinders in response to the intake manifold pressure less than the threshold. The air is pumped from the intake manifold to the engine air intake via a dedicated EGR cylinder and a dedicated EGR manifold (e.g., 48C).

At 504, method 500 judges if the vehicle is coasting and a downshift is commanded. In one example, method 500 may judge that the vehicle is coasting if the driver demand torque is less than a threshold (e.g., less than 10 N-m). Alternatively, method 500 may judge that the vehicle is coasting if the accelerator pedal is fully released or if the accelerator pedal is released to a state where the accelerator pedal is near fully released. Further, method 500 judges if a downshift is requested or a downshift is expected to be requested within a predetermined amount of time. A downshift may be requested in response to a vehicle decelerating to less than a threshold vehicle speed in a transmission shift schedule. Further, a downshift may be expected at a time in the future by determining the vehicle's deceleration rate and determining when a shift request is expected to be made in response to a vehicle speed in a shift schedule. For example, if the vehicle is decelerating at 5 kilometers per hour per second, its present speed is 50 KPH, and a downshift is requested at 45 KPH, a downshift is expected in one second. If method 500 judges that the vehicle is coasting and a downshift is requested, or if the vehicle is coasting and a downshift is expected within a threshold amount of time, the answer is yes and method 500 proceeds to 506. Otherwise, the answer is no and method 500 proceeds to exit.

At 506, method 500 determines a maximum or threshold increase in transmission input shaft torque for the requested or an upcoming transmission downshift. In one example, method 500 determines an increase in transmission input torque via indexing lookup tables using vehicle speed, present transmission input shaft torque, transmission fluid temperature, and percentage of shift complete. Alternatively, the transmission input shaft torque increase may be calculated algorithmically. Method 500 proceeds to 508.

At 508, method 500 determines a maximum increase in transmission input shaft torque that may be provided via a motor in the driveline (e.g., 240 of FIG. 2A) based on or in response to motor torque limits and battery discharge limits. For example, if the motor is presently outputting 100 N-m of torque and its rated output capacity is 150 N-m of torque the maximum increase in transmission input shaft torque is 50 N-m if the battery has capacity to supply current in an amount that the motor uses to provide the 150 N-m. If the motor is presently outputting 100 N-m of torque and the battery has capacity to output only 10 additional amperes, the maximum transmission torque that may be provided by the motor is the 100 N-m plus the additional torque the motor provides with an additional 10 amperes. The maximum motor torque may be based on present motor speed and battery maximum current output capacity. For example, motor speed and maximum battery current output may be used to index a table holding a plurality of empirically determined motor torque values that are based on the motor speed and the maximum battery current. Method 500 proceeds to 512.

At 512, method 500 judges what operating state the engine is presently in. The engine may be combusting air and fuel in at least a fraction of the engine's cylinders. The valves of the cylinders combusting air and fuel open and close during a cycle of the engine (e.g., two engine revolutions). If the engine is in a combusting mode, method 500 proceeds to 514.

During some instances, the engine may be in deceleration cylinder cut off (DCCO) mode where all engine cylinders are deactivated with intake valves and exhaust valves held in closed positions as the engine rotates over two engine revolutions. Fuel delivery (and possibly spark) to the engine cylinders is also ceased. Air or exhaust may be trapped in the cylinders when the cylinders are deactivated so that engine pumping losses may be reduced. If method 500 judges that engine cylinders are in DCCO mode, method 500 proceeds to 520.

The engine may also be in a deceleration fuel shut off (DFSO) mode where intake and exhaust valves of at least some cylinders continue to open and close as the engine rotates and cylinders are deactivated. The engine cylinders may be deactivated by ceasing to deliver fuel to the cylinders that are being deactivated. Engine pumping losses may be greater in DFSO mode than in DCCO mode. Thus, engine torque may be increased (e.g., providing less negative torque to the driveline) via switching from DFSO mode to DCCO mode if all fuel is disabled in both modes. Some engine cylinders may be deactivated in DCCO mode while other engine cylinders are deactivated in DFSO mode. If method 500 judges that at least some engine cylinders are deactivated in DFSO mode, method 500 proceeds to 530.

At 514, method 500 judges if a motor of the driveline may meet the increase in transmission input shaft torque without increasing engine torque. For example, if the increase in transmission input shaft torque at step 506 is 30 N-m and the motor may provide only 10 N-m of additional torque, the answer is no and method 500 proceeds to 516 of FIG. 5B. However, if the increase in transmission input shaft torque at 506 is 30 N-m and the motor can provide an additional 50 N-m of additional torque, the answer is yes and method 500 proceeds to 518 of FIG. 5B.

At 516, method 500 increases fuel supplied to the engine and increases torque output of cylinders that are activated via a torque actuator such as a throttle and/or spark timing. If load of active cylinders is greater than a threshold, one or more deactivated cylinders may be activated via activating (e.g., opening and closing intake and exhaust valves during an engine cycle) deactivated valves and cylinders to increase engine torque output. Additionally, torque of the motor may be prioritized such that if the battery is at a high state of charge, the motor torque may be increased to provide a significant amount of the increase in transmission input shaft torque. However, if battery state of charge is low, the motor torque may be maintained at its present level or reduced as engine torque is increased to conserve battery charge. Method 500 proceeds to 580 after increasing engine torque so that the increase in transmission input shaft torque determined at step 506 is provided.

At 518, method 500 maintains engine torque at its present level and modulates (e.g., increases) motor torque to provide the increase in transmission input shaft torque determined at step 506. The motor torque may be increased via increasing current supplied to the motor. Method 500 proceeds to 580 after increasing motor torque to provide the increase in transmission input shaft torque determined at step 506.

At 520, method 500 judges if a motor of the driveline may meet the increase in transmission input shaft torque according to motor limits and battery limits. For example, if the increase in transmission input shaft torque at step 506 is 30 N-m and the motor may provide only 10 N-m of additional torque because the motor is rated at its current output torque plus 10 N-m, the answer is no and method 500 proceeds to 522 of FIG. 5B. However, if the increase in transmission input shaft torque at 506 is 30 N-m and the motor can provide an additional 50 N-m of additional torque because the motor is rated at 50 N-m more than its current output torque, the answer is yes and method 500 proceeds to 528 of FIG. 5B.

At 522, method 500 determines an actual total number of engine cylinders to activate to meet the request in transmission input torque determined at step 506 based on motor torque capability and battery output capability. For example, if the motor has no capacity to increase its torque output due to battery charge limits or motor torque limits, the increase in transmission input shaft torque determined at step 506 may be provided by activating engine cylinders. If the increase in transmission input shaft torque is 30 N-m and each engine cylinder at the present engine speed, torque converter impeller speed, or transmission input shaft speed (depends on driveline configuration) has capacity to output 20 N-m of torque, two engine cylinders may be activated to provide the requested transmission input shaft torque by activating deactivated valves and supplying spark and fuel to the cylinders being activated. Method 500 may also determine an actual total number of cylinders to reactivate based on engine vibration and cylinder activation pattern. Thus, if activating two engine cylinders increases engine vibration to a level greater than a threshold, four cylinders may be reactivated to provide the increase in transmission input shaft torque with less engine vibration.

In one example, method 500 activates an actual total number of engine cylinders responsive to each engine cylinder's capacity to produce torque and the increase in transmission input shaft torque requested at step 506 as discussed above. Alternatively, method 500 may index a table or function using engine speed and requested transmission input shaft torque to determine an actual total number of engine cylinders to reactivate. Method 500 proceeds to 524.

At 524, method 500 exits DCCO mode by activating engine cylinders and cylinder poppet valves before shifting from a higher gear (e.g., fourth gear) to a lower gear (e.g., third gear) in response to the request to downshift the transmission while the vehicle is coasting and the requested increase in transmission input shaft torque determined at step 506. Method 500 may predict timing of a transmission downshift and reactivate cylinders that are in DCCO mode before the transmission downshift. For example, method 500 may determine that vehicle speed is 100 KPH and that downshift from one gear to a different gear is expected at 80 KPH. Method 500 may also judge that the vehicle is decelerating at a rate of 5 KPH/second. Therefore, method may judge that the transmission will downshift in four seconds. Engine cylinders may be reactivated before the expected transmission shift four seconds in the future so that the transmission input shaft torque may be increased at the time of the downshift to reduce driveline torque disturbances.

In addition, method 500 may pump pressure in the intake manifold down to a threshold pressure before fuel is supplied to engine cylinders so that the engine torque increase during engine starting is not greater than desired. In one example, where the engine does not include one or more dedicated EGR cylinders, intake and exhaust valves may be activated to open and close during an engine cycle while the engine is rotated unfueled via a motor and while the engine's throttle is closed to reduce intake manifold vacuum. Fuel is supplied to cylinders after intake manifold pressure has been reduced to the threshold pressure to start the engine. In this way, engine torque output during an engine restart may be controlled without having to truncate and waste engine torque.

In examples where the engine includes one or more deactivated cylinders, valves of non-dedicated EGR cylinders are held closed while the engine is not fueled and rotated via a motor. Valves of the dedicated EGR cylinder open and close as the engine is rotated via the motor. Air is pumped from the engine intake manifold to upstream of the engine's throttle and compressor (if present) so that air is evacuated from the intake manifold without directing air to the engine exhaust catalyst. Once the engine intake manifold pressure is reduced to a desired level, valves of non-dedicated EGR cylinders are reactivated (e.g., opened and closed as the engine rotates through a cycle) and fuel is supplied to non-dedicated EGR cylinders to start the engine. In this way, air may be prevented from entering the exhaust system catalyst. This way of starting the engine may be particularly beneficial when the engine and catalyst are warm because it may reduce the possibility of saturating the catalyst with oxygen, which can reduce NOx conversion efficiency in the catalyst. Method 500 proceeds to 580.

In this way, method 500 may control engine starting torque during engine restarts. By controlling engine torque during engine restarting, the engine may run-up to an idle speed more smoothly and hydrocarbon emissions may be reduced.

At 528, method 500 maintains the engine in DCCO mode and modulates (e.g., increases) motor torque to provide the increase in transmission input shaft torque determined at step 506. The motor torque may be increased via increasing current supplied to the motor. Method 500 proceeds to 580 after increasing motor torque to provide the increase in transmission input shaft torque determined at step 506.

At 530, method 500 judges if a motor of the driveline may meet the increase in transmission input shaft torque according to motor limits and battery limits. For example, if the increase in transmission input shaft torque at step 506 is 30 N-m and the motor may provide only 10 N-m of additional torque because the motor is rated at its current output torque plus 10 N-m, the answer is no and method 500 proceeds to 534 of FIG. 5B. However, if the increase in transmission input shaft torque at 506 is 30 N-m and the motor can provide an additional 50 N-m of additional torque because the motor is rated at 50 N-m more than its current output torque, the answer is yes and method 500 proceeds to 532 of FIG. 5B.

At 532, method 500 maintains the engine in DFSO mode and modulates (e.g., increases) motor torque to provide the increase in transmission input shaft torque determined at step 506. The motor torque may be increased via increasing current supplied to the motor. Method 500 proceeds to 580 after increasing motor torque to provide the increase in transmission input shaft torque determined at step 506.

At 534, method 500 judges if a motor of the driveline may meet the increase in transmission input shaft torque according to motor limits and battery limits if the engine is in DCCO mode. Engine pumping losses while an engine is in DFSO mode may be greater than engine pumping losses if the engine is in DCCO mode. As a result, negative engine torque may be reduced by transitioning the engine from DFSO mode to DCCO mode. In one example, engine shaft torque for operating the engine in DCCO mode may be determined from empirical data stored in a table or map that is indexed based on engine speed and engine temperature. Likewise, engine shaft torque for operating the engine in DFSO mode may be determined from empirical data stored in a table or map that is indexed based on engine speed and engine temperature. If the increase in transmission shaft torque determined at step 506 may be provided by operating the engine in DCCO mode and with motor torque, the answer is yes and method 500 proceeds to 536. Otherwise, the answer is no and method 500 proceeds to 538.

At 536, method 500 transitions the engine to DCCO mode form DFSO mode and delivers the increase in transmission torque via the engine and the motor. The engine may be transitioned from DFSO mode to DCCO mode by closing and holding closed valves of all engine cylinders over an engine cycle. Fuel delivery in DCCO mode is also maintained off. Thus, by changing the engine mode while the engine is rotating from DFSO to DCCO may serve to increase torque at the transmission input shaft. Method 500 proceeds to 580.

At 538, method 500 activates one or more fuel injector in cylinders that were deactivated in DFSO mode to meet the increase in transmission input shaft torque determined at step 506. Thus, engine cylinders are reactivated and begin to increase torque output by the engine. Engine torque and motor torque are adjusted to supply the increase in engine torque determined at step 506. In some examples, if less than all cylinders are reactivated, cylinders that are not activated enter DCCO mode so that excessive air is not pumped to a catalyst in the engine's exhaust system. Method 500 activates an actual total number of engine cylinders responsive to each engine cylinder's capacity to produce torque and the increase in transmission input shaft torque requested at step 506 as discussed above. Alternatively, method 500 may index a table or function using engine speed and requested transmission input shaft torque to determine an actual total number of engine cylinders to reactivate. Method 500 proceeds to 580.

At 580, after the downshift is complete, the engine is returned to the mode it was in prior to the request to downshift. However, if additional torque is requested by a controller or a human driver, the engine and motor may enter modes based on the newly requested driveline torque. Method 500 proceeds to exit.

Thus, based on motor and battery operating constraints, an engine may transition from one cylinder deactivation mode (DFSO) to a second cylinder deactivation mode (DCCO) to increase transmission input shaft torque during a vehicle coasting transmission downshift. Further, method 500 may control engine torque during engine restarting via pumping down the engine intake manifold via engine cylinders.

The method of FIGS. 5A and 5B provides for a driveline operating method, comprising: adjusting torque of a motor, adjusting a state of an engine cylinder poppet valve actuator, and adjusting a fuel injector operating state via one or more controllers in response to an increase in requested transmission input shaft torque and a transmission downshift request during vehicle coasting. The method includes where adjusting the state of the engine cylinder poppet valve actuator includes activating the engine cylinder poppet valve actuator from a deactivated state when motor output torque is insufficient to provide the increase in requested transmission input shaft torque. The method includes where adjusting the fuel injector operating state includes activating the fuel injector. The method includes where adjusting the state of the engine cylinder poppet valve actuator includes deactivating the engine cylinder poppet valve actuator from an activated state when output torque of the motor is insufficient to provide the increase in requested transmission input shaft torque. The method includes where adjusting the fuel injector operating state includes deactivating the fuel injector.

In some examples, the method further comprises decreasing pressure of an engine intake manifold without directing air to a catalyst coupled to an engine before starting an engine in response to the transmission downshift request. The method further comprises directing air from the engine intake manifold upstream of a throttle via a dedicated exhaust gas recirculation cylinder. The method includes where adjusting torque of the motor includes increasing motor output torque without increasing engine output torque in response to the increase in requested transmission input shaft torque when the motor has capacity to provide the increase in requested transmission input shaft torque.

The method of FIGS. 5A and 5B also provides for a driveline operating method, comprising: rotating an engine while driver demand torque is less than a threshold; and entering the engine into a first or second cylinder deactivation mode in response to a transmission gear downshift request while rotating the engine while driver demand torque is less than the threshold, the engine entering the first mode or the second mode in response to torque capacity of a motor and engine torque capacity in each of the first and second cylinder deactivation modes. The method includes where the engine is rotating in a deceleration fuel shut off mode while driver demand torque is less than the threshold before entering the second cylinder deactivation mode, the second cylinder deactivation mode a deceleration cylinder cut off mode. The method includes where intake and exhaust valves of at least one deactivated cylinder open and close during an engine cycle while the engine is rotating in the deceleration fuel shut off mode. The method includes where the intake and exhaust valves of all engine cylinders are held closed during an engine cycle while the engine is in the second cylinder deactivation mode. The method further comprises reducing pressure in an engine intake manifold in response to an engine start requested and the transmission gear downshift request. The method further comprises exiting the first or second cylinder deactivation mode and entering an engine mode the engine was in immediately before the transmission gear downshift request in response to a transmission gear downshift being complete.

Referring now to FIG. 6, an example vehicle operating sequence is shown. The sequence of FIG. 6 may be provided according to the method of FIGS. 5A and 5B along with or in conjunction with the system of FIGS. 1-4B. The plots shown in FIG. 6 occur at the same time and are aligned in time.

The first plot from the top of FIG. 6 is a plot of vehicle coasting state versus time. The vertical axis represents vehicle coasting state. The vehicle is coasting (e.g., traveling on a road with a driver demand torque less than a threshold level (e.g., less than 10 N-m). The vehicle is coasting when the vehicle coasting state trace is at a higher level near the vertical axis arrow. The vehicle is not coasting when the vehicle coasting state trace is at a lower level near the horizontal axis. The horizontal axis represents time and time increases from the left side of the figure to the right side of the figure.

The second plot from the top of FIG. 6 is a plot of a transmission downshift request versus time. The vertical axis represents a downshift request. A transmission downshift is requested when the downshift request trace is at a higher level near the vertical axis arrow. The transmission is not requested to downshift when the transmission downshift request trace is at a lower level near the horizontal axis. The horizontal axis represents time and time increases from the left side of the figure to the right side of the figure.

The third plot from the top of FIG. 6 is a plot of engine intake manifold pressure versus time. The vertical axis represents the engine intake manifold pressure and engine intake manifold pressure increases in the direction of the vertical axis arrow. The horizontal axis represents time and time increases from the left side of the figure to the right side of the figure. Horizontal line 602 represents a desired intake manifold pressure for starting the engine. The engine may be started when engine intake manifold pressure is less than or equal to the value at 602.

The fourth plot from the top of FIG. 6 is a plot of state of the engine versus time. The vertical axis represents the engine operating state. The engine may be in one of two cylinder deactivation modes DFSO or DCCO. Alternatively, the engine may be in a combustion mode (COMB.) where fuel is combusted in at least one engine cylinder. The horizontal axis represents stroke and position of the cylinder as previously discussed.

The fifth plot from the top of FIG. 6 is a plot of motor torque output versus time. The vertical axis represents motor torque output and motor torque output increases in the direction of the vertical axis arrow. The horizontal axis represents time and time increases from the left side of the figure to the right side of the figure. Horizontal line 604 represents a maximum or rated motor torque. Horizontal line 606 represents a threshold torque, which when motor torque is above the level of line 606, engine torque is adjusted to meet an increase in requested transmission input shaft torque.

The sixth plot from the top of FIG. 6 is a plot of a requested transmission input shaft torque increase versus time. The vertical axis represents the requested transmission input shaft torque increase during vehicle deceleration in response to a requested transmission downshift. The horizontal axis represents time and time increases from the left side of the figure to the right side of the figure.

At time T0, the vehicle is not coasting and downshifting is not requested. The engine intake manifold pressure is at a middle level indicating that the engine is being loaded. The engine is operating in a combustion mode and the motor torque is at a higher level. The requested increase in transmission input shaft torque is zero.

At time T1, the vehicle enters a coasting mode as indicated by the vehicle coasting state. The engine enters DFSO mode where engine intake and exhaust valves open and close while the engine rotates, but fuel flow to engine cylinders is stopped. The intake and exhaust valves of a dedicated EGR cylinder of the engine are also open and close as the engine rotates. The engine's intake manifold pressure drops in response to the throttle being closed (not shown) and the engine entering DFSO mode. The motor torque begins to decrease and the requested increase in transmission input shaft torque is zero. The vehicle may enter a coasting mode when a driver releases an accelerator pedal and driver demand torque is reduced to less than a threshold value.

At time T2, a downshift is requested. Since engine intake manifold pressure is low and motor torque output is above threshold 606, the engine mode is transitioned from DFSO mode to DCCO mode by closing and holding closed intake and exhaust valves of the engine. The intake and exhaust valves of the dedicated EGR cylinder are also held in a closed state as the engine rotates. Transitioning to DCCO mode reduces negative torque produced by the engine due to engine pumping, thereby increasing transmission input shaft torque. The transmission input shaft torque increase is a small amount that may be provided by transitioning the engine operating mode. The engine intake manifold pressure increases a small amount since air may leak past the throttle while intake and exhaust valves of the engine are held closed while the engine continues to rotate.

At time T3, the downshift is completed as indicated by the downshift request trace transitioning to a lower level. The engine transitions back to DFSO mode to increase engine braking in response to the downshift being complete. The engine intake manifold pressure is reduced in response to the engine entering DFSO mode since opening and closing the intake and exhaust valves allows the pistons to pump the engine intake manifold pressure down. The motor torque continues to decrease since the vehicle is in a coasting mode. The requested increase in transmission input shaft torque is zero.

At time T4, the vehicle exits coasting mode in response to an increase in the requested powertrain or driveline torque (not shown). The engine enters combustion mode and engine intake manifold pressure increases to meet the driver demand requirement. The motor torque is also increased to meet the driver demand requirement. The requested increase in transmission input shaft torque is zero.

At time T5, the vehicle enters a coasting mode for a second time as indicated by the vehicle coasting state. The engine enters DCCO mode where engine intake and exhaust valves are held closed while the engine rotates through an engine cycle. The intake and exhaust valves of a dedicated EGR cylinder are also held in a closed state as the engine rotates. Fuel flow to engine cylinders is also stopped. The engine's intake manifold pressure remains at a higher level since closed intake and exhaust valves prevent air from being pumped from the intake manifold. The motor torque begins to decrease and the requested increase in transmission input shaft torque is zero. The vehicle may enter a coasting mode when a driver releases an accelerator pedal and driver demand torque is reduced to less than a threshold value.

At time T6, intake and exhaust valves of a dedicated EGR cylinder are activated and air is pumped from the engine intake manifold to the engine air intake via the dedicated EGR cylinder. Lowering the intake manifold pressure allows the engine to restart and produce less torque during engine restart so that engine speed does not increase and driveline torque disturbances may be reduced. Further, engine hydrocarbon output may be reduced. The intake manifold pressure is reduced before time T7 in response to an expectation of a requested downshift at time T7 so that the shift does not have to be delayed.

At time T7, a downshift is requested. Since the requested increase in transmission input shaft may not be met by the motor and since engine intake manifold pressure is low, the engine mode is transitioned from DCCO mode to combustion mode by activating intake and exhaust valves of the engine and supplying fuel to the engine. Transitioning to combustion mode allows the engine to meet the requested transmission input shaft torque. Further, since battery state of charge is at a lower level (not shown), motor output torque may be decreased while the transmission input shaft torque is met.

At time T8, the downshift is completed as indicated by the downshift request trace transitioning to a lower level. The engine transitions back to DCCO mode to reduce engine torque in response to the downshift being complete. The engine intake manifold pressure is maintained at a lower level, but if desired the intake manifold pressure may be raised before entering DCCO to increase the air cushion or spring force in the cylinder. The motor torque continues to decrease since the vehicle is in a coasting mode. The requested increase in transmission input shaft torque is zero.

At time T9, the vehicle exits coasting mode in response to an increase in the requested powertrain or driveline torque (not shown). The engine enters combustion mode and engine intake manifold pressure increases to meet the driver demand requirement. The motor torque is also increased to meet the driver demand requirement. The requested increase in transmission input shaft torque is zero.

At time T10, the vehicle enters a coasting mode for a third time as indicated by the vehicle coasting state. The engine enters remains in a combustion mode where engine intake and exhaust valves open and close while the engine rotates and fuel flow is provided to the engine. The intake and exhaust valves of a dedicated EGR cylinder of the engine are also open and close as the engine rotates. The engine's intake manifold pressure drops in response to the throttle being closed (not shown) while the engine is operating in combustion mode. The motor torque begins to decrease and the requested increase in transmission input shaft torque is zero. The vehicle may enter a coasting mode when a driver releases an accelerator pedal and driver demand torque is reduced to less than a threshold value.

At time T11, a downshift is requested. Since engine is operating, the increase in requested transmission input shaft may be provided by the engine and motor torque may be reduced. The motor torque is zero and the engine intake manifold pressure increases in response to the engine load increasing. The vehicle remains in a coasting state.

At time T12, the downshift is completed as indicated by the downshift request trace transitioning to a lower level. The engine remains in combustion mode and the engine operates at a low load. The requested increase in transmission input shaft torque is zero and the engine intake manifold pressure decreases. The vehicle remains in a coasting mode.

At time T13, the vehicle exits coasting mode in response to an increase in the requested powertrain or driveline torque (not shown). The engine continues in combustion mode and engine load increases as indicated by the increase in engine intake manifold pressure. The engine torque is increased to meet the driver demand requirement (not shown). The motor torque remains at a low level and the requested increase in transmission input shaft torque is zero.

In this way, a driveline may transition between different cylinder deactivation modes in response to whether or not an increase in transmission input shaft torque for a downshift may be met via engine and motor torque. Further, engine intake manifold pressure may be adjusted to a lower level in response to an expected engine start so that the possibility of driveline torque disturbances may be reduced.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline operating method, comprising:
via a controller, adjusting an amount of torque of a motor, adjusting a state of an engine cylinder poppet valve actuator, and adjusting, via activating or deactivating, a fuel injector operating state via one or more controllers in response to an increase in an amount of requested transmission input shaft torque and a transmission downshift request during vehicle coasting.

2. The method of claim 1, where adjusting the state of the engine cylinder poppet valve actuator includes activating the engine cylinder poppet valve actuator from a deactivated state when the motor output torque amount is less than the increase in the amount of requested transmission input shaft torque.

3. The method of claim 2, where adjusting the fuel injector operating state includes activating a fuel injector.

4. The method of claim 1, where adjusting the state of the engine cylinder poppet valve actuator includes deactivating the engine cylinder poppet valve actuator from an activated state when the amount of motor output torque less than the increase in the amount of requested transmission input shaft torque.

5. The method of claim 4, where adjusting the fuel injector operating state includes deactivating a fuel injector.

6. The method of claim 1, further comprising decreasing pressure of an engine intake manifold without directing air to a catalyst coupled to an engine before starting the engine in response to the transmission downshift request.

7. The method of claim 1, further comprising directing air from an engine intake manifold upstream of a throttle via a dedicated exhaust gas recirculation cylinder.

8. The method of claim 1, where adjusting torque of the motor includes increasing the amount of motor output torque without increasing engine output torque in response to the increase in the amount of requested transmission input shaft torque when the motor has capacity to provide the increase in the amount of requested transmission input shaft torque.

9. The method of claim 8, where the engine is rotating in a deceleration fuel shut off mode while driver demand torque is less than the threshold before entering the second cylinder deactivation mode, the second cylinder deactivation mode a deceleration cylinder cut off mode.

10. The method of claim 9, where intake and exhaust valves of at least one deactivated cylinder open and close during an engine cycle while the engine is rotating in the deceleration fuel shut off mode.

11. The method of claim 10, where the intake and exhaust valves of all engine cylinders are held closed during an engine cycle while the engine is in the second cylinder deactivation mode.

12. A driveline operating method, comprising:
operating with an engine rotating while driver demand torque is less than a threshold; and
entering the engine into a first or second cylinder deactivation mode in response to a transmission gear downshift request while the engine is rotating and while driver demand torque is less than the threshold, the engine entering the first or second cylinder deactivation mode in response to torque capacity of a motor and engine torque capacity in each of the first and second cylinder deactivation modes.

13. The method of claim 12, further comprising reducing pressure in an engine intake manifold in response to an engine start request and the transmission gear downshift request.

14. The method of claim 12, further comprising exiting the first or second cylinder deactivation mode and entering an engine mode the engine was in immediately before the transmission gear downshift request in response to a transmission gear downshift being complete.

15. A system, comprising:
an engine;
an integrated starter/generator coupled to the engine;
a transmission coupled to the integrated starter/generator; and
a vehicle system controller including executable instructions stored in non-transitory memory to maintain or increase torque output of the integrated starter/generator and enter the engine into one of two cylinder deactivation modes in response to a request to downshift a transmission while a vehicle in which the engine resides is coasting.

16. The system of claim 15, further comprising additional instructions stored in the non-transitory memory for deactivating cylinder valve actuators, and
adjusting an operating state of the deactivating cylinder valve actuators in response to the request to downshift the transmission.

17. The system of claim 15, further comprising additional instructions stored in the non-transitory memory to determine an increase in transmission input shaft torque for the requested downshift.

18. The system of claim 15, further comprising additional instructions stored in the non-transitory memory to reduce an intake manifold pressure of the engine without directing air from an intake manifold of the engine to a catalyst coupled to the engine.

19. The system of claim 15, further comprising additional instructions stored in the non-transitory memory to reduce intake manifold pressure of the engine and direct air from an intake manifold of the engine to a catalyst coupled to the engine.

20. The system of claim 15, where the engine includes a dedicated exhaust gas recirculation cylinder.

* * * * *